United States Patent
Matsubara

(10) Patent No.: US 9,461,678 B2
(45) Date of Patent: Oct. 4, 2016

(54) CALCULATION OF VOLTAGE STANDING WAVE RATIO IN RADIO DEVICE

(71) Applicant: FUJITSU LIMITED, Kawasaki-shi, Kanagawa (JP)

(72) Inventor: Satoshi Matsubara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/681,596

(22) Filed: Apr. 8, 2015

(65) Prior Publication Data
US 2015/0349815 A1   Dec. 3, 2015

(30) Foreign Application Priority Data

May 27, 2014  (JP) ................................ 2014-109351

(51) Int. Cl.
| | | |
|---|---|---|
| H04B 1/04 | (2006.01) | |
| H04L 27/38 | (2006.01) | |
| H04L 25/03 | (2006.01) | |

(52) U.S. Cl.
CPC ....... H04B 1/0475 (2013.01); H04L 25/03343 (2013.01); H04B 2001/0416 (2013.01); H04L 27/3881 (2013.01)

(58) Field of Classification Search
CPC . H03G 3/3042; H03F 2200/393; H03F 1/30; H04L 27/368; H04L 25/03343; H04L 1/0475; H04L 27/3881; H04B 1/0458; H04B 17/102; H04B 17/103; H04B 2001/0416; H44B 17/103

See application file for complete search history.

(56) References Cited

U.S. PATENT DOCUMENTS

| | | | | |
|---|---|---|---|---|
| 5,903,823 | A * | 5/1999 | Moriyama et al. | 455/126 |
| 6,091,303 | A * | 7/2000 | Dent | H03C 3/0966 327/147 |
| 6,803,818 | B2 * | 10/2004 | van Amerom | 330/144 |
| 7,352,832 | B1 * | 4/2008 | Lewis | H04L 25/06 375/345 |
| 8,705,595 | B2 * | 4/2014 | Bailey et al. | 375/221 |
| 9,054,759 | B2 * | 6/2015 | Watanabe | 375/296 |
| 2002/0123363 | A1 * | 9/2002 | Hildebrand et al. | 455/522 |
| 2007/0121267 | A1 * | 5/2007 | Kotani et al. | 361/85 |
| 2007/0232249 | A1 | 10/2007 | Kwon et al. | |
| 2008/0212712 | A1 * | 9/2008 | Traeger et al. | 375/296 |
| 2011/0053632 | A1 * | 3/2011 | Liu | 455/522 |
| 2013/0107914 | A1 * | 5/2013 | Park | H04B 1/40 375/219 |

FOREIGN PATENT DOCUMENTS

| | | |
|---|---|---|
| JP | 2007-281943 | 10/2007 |
| JP | 2007-282238 | 10/2007 |
| JP | 2013-165418 | 8/2013 |

* cited by examiner

Primary Examiner — Sophia Vlahos
(74) Attorney, Agent, or Firm — Fujitsu Patent Center

(57) ABSTRACT

A radio device is configured to be capable of performing upsampling on a forward wave containing a first signal and a second signal to broaden a processing band to a transmission band, then amplifying the forward wave using an amplifier, and transmitting the amplified forward wave. In the radio device, an FW power calculator calculates the power of a first component corresponding to a part of the transmission band from among the forward wave. An Rev power calculator calculates the power of a second component corresponding to a part of the transmission band from among a reflected wave. A VSWR calculator calculates a VSWR using the power of the forward wave calculated by the FW power calculator and the power of the reflected wave calculated by the Rev power calculator.

5 Claims, 10 Drawing Sheets

CALCULATION OF VOLTAGE STANDING WAVE RATIO IN RADIO DEVICE

CROSS-REFERENCE TO RELATED APPLICATION(S)

This application is based upon and claims the benefit of priority of the prior Japanese Patent Application No. 2014-109351, filed on May 27, 2014, the entire contents of which are incorporated herein by reference.

FIELD

The embodiments discussed herein are related to a radio device.

BACKGROUND

A radio device includes a high-frequency amplifier and an antenna that is connected to the output terminal of the high-frequency amplifier with a transmission line. When a radio signal is transmitted with a large power while the high-frequency amplifier, the transmission line, and the antenna are not matched, the devices of the high-frequency amplifier may be damaged due to the "reflected wave" from the antenna. In order to avoid the damage of the devices of the amplifier, conventional radio devices measures the voltage wave standing ratio (VSWR) that is the ratio between the "forward wave" and the "reflected wave" and implement control to stop the output of the high-frequency amplifier when it is determined, according to the measured VSWR, that there is a risk that the devices of the amplifier would be damaged. The "forward wave" corresponds to the signal transmitted by the radio device and the "reflected wave" corresponds to the signal that is the transmitted wave reflected by the antenna.

In the feedback path for measuring reflected waves from the antenna, there would be a received signal that is a signal from a different station received by the antenna (that can be referred to as a "different station signal" below) in addition to the reflected wave from the antenna. When the different station signal is mixed into the feedback signal, the accuracy of the VSWR lowers.

Thus, conventionally, in the feedback path, only the signal components of the "transmission band" are extracted using a band-pass filter and, using the extracted signal components, the VSWR is measured. The radio device performs upsampling on the transmitted signal of the "baseband signal band" to obtain a transmitted signal of the "transmission band". The radio device further performs radio processing, such as digital-analog conversion, upconversion and amplification, on the transmitted signal of the "transmission band" and then transmits the resulting radio signal. The whole band including at least one transmission band can be referred to as the "system band". The "baseband signal band" can be referred to as the "baseband processing rate", "baseband processing sampling frequency", or "baseband processing data rate". The "transmission band" can be referred to as the "transmission processing rate", "transmission processing sampling frequency", or "transmission processing data rate". Conventional examples are described in Japanese Laid-open Patent Publication No. 2013-165418, Japanese Laid-open Patent Publication No. 2007-281943 and Japanese Laid-open Patent Publication No. 2007-282238

The conventional technology, however, measures the VSWR based on the signal components of the whole transmission band, which may increase the costs of operations for the measurement.

When a radio device that is mounted on a terminal that supports a system band including several transmission bands (e.g. a dual terminal) measures the VSWR based on the signal components of the whole system band, the costs of operations for the measurement may further increase. For example, measuring the VSWR has repeated operations according to the cycle of integration of a relatively short time (e.g. 10 sec.). For this reason, when the VSWR is measured based on the signal components of the whole system band, the load of operations performed by the radio device increases as the system band broadens.

SUMMARY

According to an aspect of an embodiment, a radio device is capable of performing upsampling on a forward wave containing a first signal and a second signal to broaden a processing band to a transmission band, then amplifying the forward wave using an amplifier, and transmitting the forward wave. The radio device comprising: a first calculator that calculates the power of a first component corresponding to a part of the transmission band from among the forward wave; a second calculator that calculates the power of a second component corresponding to a part of the transmission band from among a reflected wave from the antenna toward the amplifier; a third calculator that calculates a voltage standing wave ratio on the basis of the calculated power of the first component and the calculated power of the second component.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The embodiments do not limit the radio device disclosed wherein. The same reference numbers denote the same configurations with the same functions according to the embodiments and redundant explanations will not be provided.

[a] First Embodiment

Exemplary Configuration of Amplifier

Figure 1:
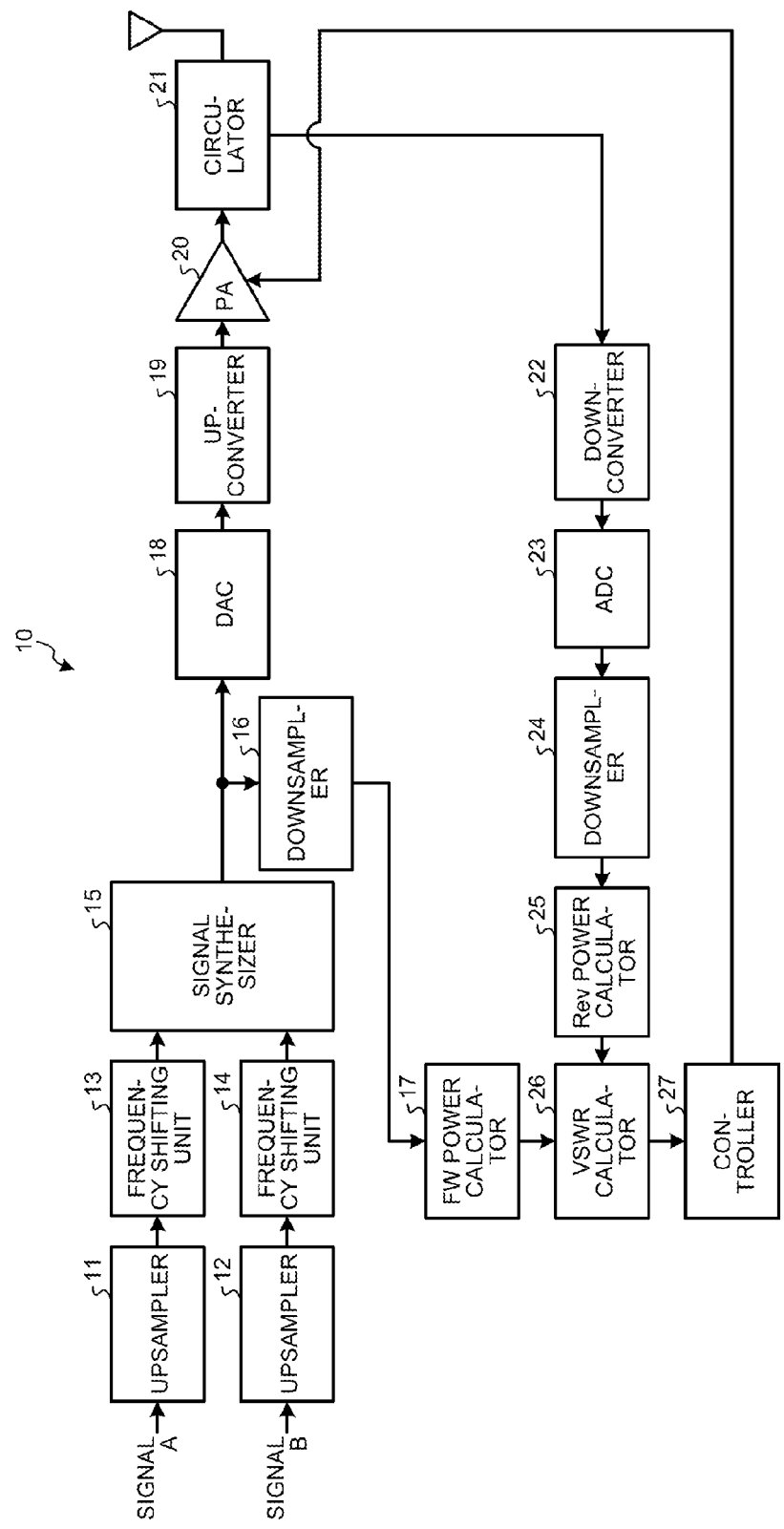
FIG. 1 is a block diagram of an exemplary radio device according to a first embodiment.

FIG. 1 is a block diagram of an exemplary radio device according to a first embodiment. As illustrated in FIG. 1, a radio device 10 includes upsamplers 11 and 12, frequency shifting units 13 and 14, a signal synthesizer 15, downsamplers 16 and 24, a forward wave (FW) power calculator 17, a digital-analog converter (DAC) 18, an upconverter 19, and a power amplifier (PA) 20. The radio device 10 includes a circulator 21, a downconverter 22, an analog-digital converter (ADC) 23, a reflected wave (Rev) power calculator 25, a voltage standing wave ratio (VSWR) calculator 26, and a controller 27. The functional unit that calculates the power of the forward wave can be referred to as a "first calculator" and the functional unit that calculates the power of the reflected wave can be referred to as a "second calculator". According to the first embodiment, the FW power calculator 17 servers as the "first calculator" and the Rev power calculator 25 servers as the "second calculator".

A signal A having a "baseband signal band" is inputted to the upsampler 11. The signal A has, for example, a transmission bandwidth of 5 MHz and a center frequency of 0 Hz. The upsampler 11 performs upsampling on the input signal A and outputs the signal A having a "transmission band" wider than the "baseband signal band". In other words, the upsampler 11 converts the signal A having the baseband processing rate to the signal A having a transmission processing rate higher than the baseband processing rate. In other words, the upsampler 11 broadens the signal band. The output signal from the upsampler 11 is a signal having a center frequency of 0 Hz.

A signal B having a "baseband signal band" is input to the upsampler 12. The signal B, for example, has a transmission bandwidth of 5 MHz and a center frequency of 0 Hz. The upsampler 12 performs upsampling on the input signal B and outputs the signal B having a "transmission band" wider than the "baseband signal band". The output signal from the upsampler 12 is a signal having a center frequency of 0 Hz.

The frequency shifting unit 13 and the frequency shifting unit 14 shift the frequency of the output signal from the upsampler 11 and the frequency of the output signal from the upsampler 12, respectively, such that the shifted frequencies of the signals do not overlap. For example, the frequency shifting unit 13 shifts the frequency of the output signal from the upsampler 11 by a half of the transmission band in the negative direction along frequency axis. On the other hand, the frequency shifting unit 14 shifts the frequency of the output signal from the upsampler 12 by a half of the transmission band in the positive direction along frequency axis. In other words, it is satisfactory if the signal whose frequency is shifted by the frequency shifting unit 13 and the signal whose frequency is shifted by the frequency shifting unit 14 are relatively shifted by at least the transmission band width.

The signal synthesizer 15 synthesizes the signal whose frequency is shifted by the frequency shifting unit 13 and the signal whose frequency is shifted by the frequency shifting unit 14 and outputs a synthesized signal. In other words, the "forward signal" contains the signal A and the signal B having the baseband signal bands, respectively.

The downsampler 16 performs downsampling (e.g., decimation) on the synthesized signal that is output from the signal synthesizer 15 and outputs a signal corresponding to a part of the transmission band from among the transmitted wave.

The FW power calculator 17 calculates the "FW power" by performing integration on the power of the signal that is output from the downsampler 16. The signal that is input to the FW power calculator 17 has a processing rate that is the baseband processing rate lowered from the transmission processing rate by the downsampler 16. In other words, the FW power calculator 17 calculates the power of a "first component" corresponding to a part of the transmission band from among the forward wave. This reduces the amount of calculation performed by the FW power calculator 17 compared a case where the power of the signal having the transmission processing rate is calculated.

The DAC 18 performs digital-analog conversion on the synthesized signal that is output from the signal synthesizer 15 and outputs the resulting analog signal to the upconverter 19.

The upconverter 19 performs upconversion on the analog signal that is output from the DAC 18 and outputs the resulting radio signal to the PA 20.

The PA 20 amplifies the radio signal that is output from the upconverter 19 and transmits the amplified radio signal via the circulator 21 and an antenna. Upon receiving an output stop instruction signal from the controller 27, the PA 20 stops the output.

The circulator 21 is connected to each of the PA 20, the antenna, and the downconverter 22. The circulator 21 outputs the signal from a terminal corresponding to a terminal to which the signal is input. In other words, the circulator 21 performs signal allocation control. Specifically, the signal that is output from the PA 20 is output to the antenna. Furthermore, a signal that is input from the antenna toward the PA 20 is output to the downconverter 22, i.e., toward a feedback path.

The downconverter 22 performs downconversion on the radio signal that is received from the antenna via the circulator 21 and outputs the resulting signal to the ADC 23.

The ADC 23 performs analog-digital conversion on the signal that is output from the downconverter 22 and outputs the resulting digital signal to the downsampler 24.

The downsampler 24 performs downsampling (decimation) on the signal that is output from the ADC 23 and outputs a signal corresponding to a part of the transmission band from among the reflected wave to the Rev power calculator 25.

The Rev power calculator 25 performs integration on the power of the signal that is output from the downsampler 24 to calculate the "Rev power". The downsampler 24 sets the baseband processing rate for the processing rate of the signal that is to be input to the Rev power calculator 25. In other words, the Rev power calculator 25 calculates the power of a "second component" corresponding to a part of the transmission band from among the reflected wave. This reduces the amount of calculation performed by the Rev power calculator 25 compared a case where the power of the signal having the transmission processing rate is calculated.

The VSWR calculator 26 calculates the VSWR using the "FW power" calculated by the FW power calculator 17 and the "Rev power" calculated by the Rev power calculator 25. The VSWR is a ratio of the "Rev power" to the "FW power".

Upon determining that the Rev power is above a given level according to the VSWR that is calculated by the VSWR calculator 26, the controller 27 outputs an output stop instruction signal to the PA 20. This makes it possible to stop the output of the PA 20 when it is determined that there is a risk that the devices of the amplifier would be damaged by the reflected wave. For example, when the VSWR calculated by the VSWR calculator 26 is equal to or more than a threshold, the controller 27 outputs the output stop instruction signal to the PA 20.

Exemplary Operations of Amplifier

Exemplary processing operations of the radio device 10 having the above-descried configuration will be described below. FIGS. 2 to 9 are diagrams for explaining the processing operations of the radio device according to the first embodiment.

Figure 2:
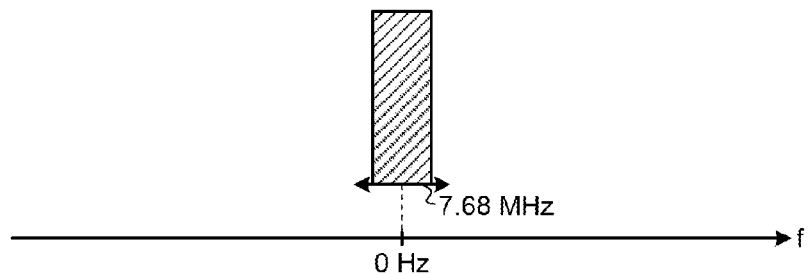
FIG. 2 is a diagram for explaining processing operations performed by the radio device according to the first embodiment.

As illustrated in FIG. 2, a signal A has a baseband processing rate of 7.68 MHz and a transmission bandwidth of 5 MHz. The signal A is a signal having a center frequency of 0 Hz.

Figure 3:
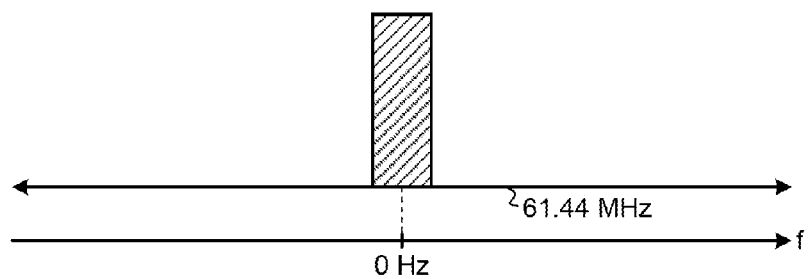
FIG. 3 is a diagram for explaining processing operations performed by the radio device according to the first embodiment.

The upsampler 11 converts the signal A having the baseband processing rate into the signal A having a transmission processing rate higher than the baseband processing rate. FIG. 3 illustrates the signal A having a transmission processing rate of 61.44 MHz. The center frequency of the signal A after the rate conversion processing performed by the upsampler 11 is also 0 Hz.

Figure 4:
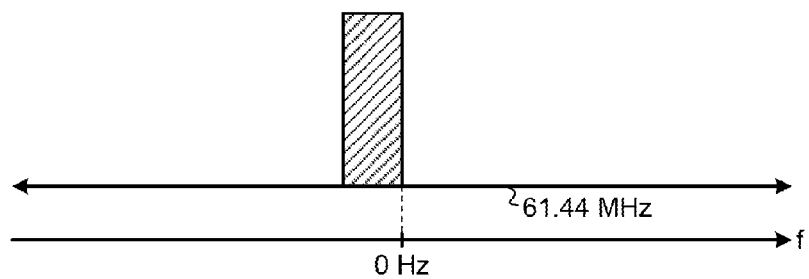
FIG. 4 is a diagram for explaining processing operations performed by the radio device according to the first embodiment.

As illustrated in FIG. 4, the frequency shifting unit 13 shifts the output signal from the upsampler 11 by, for example, a half of the transmission band width (i.e., 2.5 MHz) in the negative direction along the frequency axis.

Figure 5:
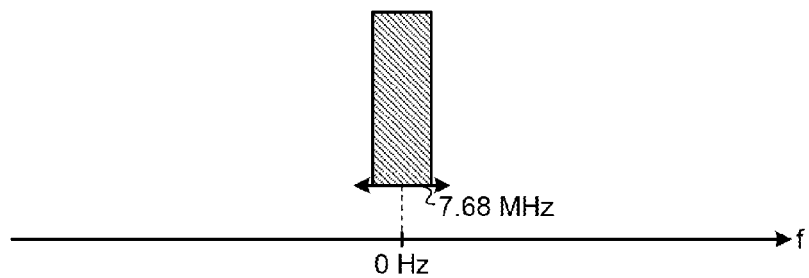
FIG. 5 is a diagram for explaining processing operations performed by the radio device according to the first embodiment.

As illustrated in FIG. 5, a signal B has a baseband processing rate of 7.68 MHz and a transmission bandwidth of 5 MHz. The signal B is a signal having a center frequency of 0 Hz.

Figure 6:
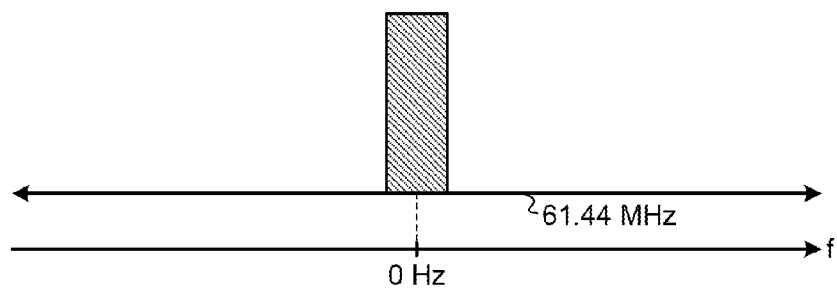
FIG. 6 is a diagram for explaining processing operations performed by the radio device according to the first embodiment.

The upsampler 12 coverts the signal B having the baseband processing rate into the signal B having a transmission processing rate higher than the baseband processing rate. FIG. 6 illustrates the signal B having a transmission processing rate of 61.44 MHz. The center frequency of the signal B after the rate conversion processing performed by the upsampler 12 is also 0 Hz.

Figure 7:
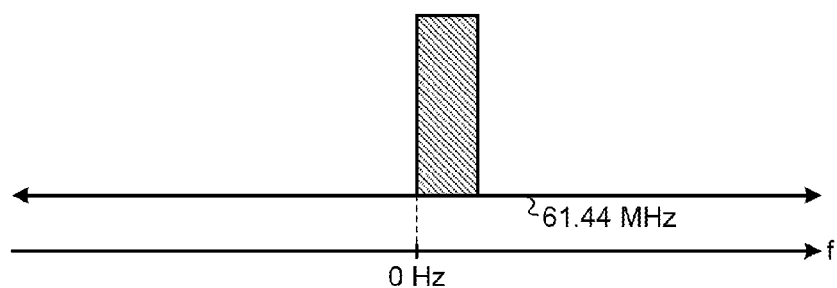
FIG. 7 is a diagram for explaining processing operations performed by the radio device according to the first embodiment.

As illustrated in FIG. 7, the frequency shifting unit 14 shifts the output signal from the upsampler 12 by, for example, a half of the transmission band width (i.e., 2.5 MHz) in the positive direction along the frequency axis.

Figure 8:
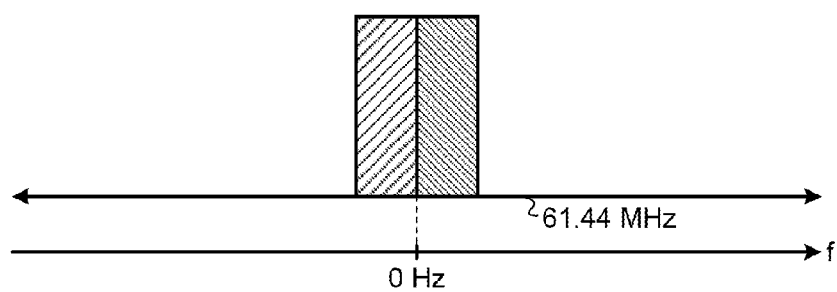
FIG. 8 is a diagram for explaining processing operations performed by the radio device according to the first embodiment.

The signal synthesizer 15 synthesizes the signal whose frequency is shifted by the frequency shifting unit 13 and the signal whose frequency is shifted by the frequency shifting unit 14. FIG. 8 is a diagram for explaining the synthesized signal. As illustrated in FIG. 8, the synthesized signal contains the output signal from the upsampler 11 and the output signal from the upsampler 12 that do not overlap on the frequency axis.

Figure 9:
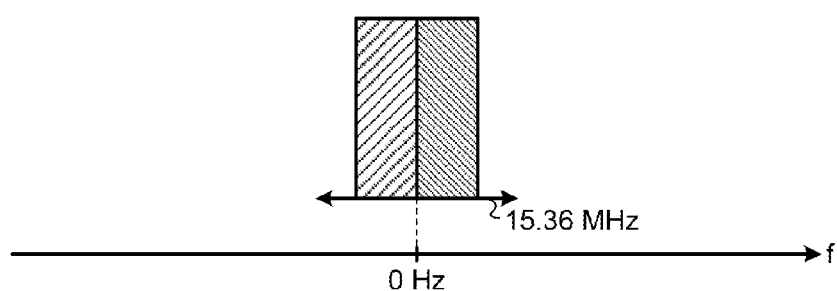
FIG. 9 is a diagram for explaining processing operations performed by the radio device according to the first embodiment.

The downsampler 16 performs downsampling (decimation) on the synthesized signal that is output from the signal synthesizer 15 and outputs a signal corresponding to a part of the transmission band from among the transmitted wave. FIG. 9 illustrates the output signal from the downsampler 16. In other words, the output signal from the downsampler 16 has a sampling rate of, for example, 15.36 MHz.

The FW power calculator 17 calculates the "FW power" by performing integration on the power of the signal that is output from the downsampler 16. For example, the interval of integration of power is 100 ms. Thus, the FW power calculator 17 calculates the FW power using the data on $(15.36 \times 10^5)$ samples. If the downsampling performed by the downsampler 16 is not performed, the FW power calculator 17 calculates the forward power using the data on $(61.44 \times 10^5)$ samples. In other words, because the FW power calculator 17 calculates the power of the "first component" corresponding to a part of the transmission band from among the forward wave, the amount of calculation performed by the FW power calculator 17 can be reduced compared to a case where the power of the signal having the transmission processing rate is calculated.

The DAC 18 performs digital-analog conversion on the synthesized signal that is output from the signal synthesizer 15 and outputs the resulting analog signal to the upconverter 19. The upconverter 19 performs upconversion on the analog signal that is output from the DAC 18 and outputs the resulting radio signal to the PA 20. The PA 20 amplifies the radio signal that is output from the upconverter 19 and transmits the amplified radio signal via the circulator 21 and the antenna.

On the other hand, in the feedback path, the downconverter 22 performs downconversion on the radio signal that is received from the antenna via the circulator 21 and outputs the resulting signal to the ADC 23. The ADC 23 performs analog-digital conversion on the signal that is output from the downconverter 22 and outputs the resulting digital signal to the downsampler 24. The signal state of the output signal from the ADC 23 is illustrated in FIG. 8.

The downsampler 24 performs downsampling (decimation) on the signal that is output from the ADC 23 and outputs the signal corresponding to a part of the transmission band from among the reflected wave to the Rev power calculator 25. The signal state of the output signal from the downsampler 24 is illustrated in FIG. 9. In other words, the output signal from the downsampler 24 has, for example, a sampling rate of 15.36 MHz.

The Rev power calculator 25 performs integration on the power of the signal that is output from the downsampler 24 to calculate the "Rev power". For example, the interval of integration of power is 100 ms. Thus, the Rev power calculator 25 calculates the Rev power using the data on $(15.36 \times 10^5)$ samples. If the downsampling performed by the downsampler 24 is not performed, the Rev power calculator 25 calculates the Rev power using the data on $(61.44 \times 10^5)$ samples. In other words, because the Rev power calculator 25 calculates the power of the "second component" corresponding to a part of the transmission band from among the reflected wave, it is possible to reduce the amount of calculation performed by the Rev power calculator 25 compared to a case where the power of the signal having the transmission processing rate is calculated.

The VSWR calculator 26 calculates the VSWR using the "FW power" that is calculated by the FW power calculator 17 and the "Rev power" that is calculated by the Rev power calculator 25.

Upon determining that the Rev power is above the given level according to the VSWR that is calculated by the VSWR calculator 26, the controller 27 outputs an output stop instruction signal to the PA 20. This makes it possible to stop the output of the PA 20 when it is determined that there is a risk that the devices of the amplifier would be damaged by the reflected wave.

As described above, according to the first embodiment, the radio device 10 is configured to be capable of performing upsampling on a forward wave containing a first signal (corresponding to the signal A) and a second signal (corresponding to the signal B) to broaden a processing band to a transmission band, then amplifying the forward wave using an amplifier, and transmitting the amplified forward wave. The FW power calculator 17 of the radio device 10 calculates the power of the first component corresponding to a part of the transmission band from among the forward wave. The Rev power calculator 25 calculates the power of the second component corresponding to a part of the transmission band from the reflected wave. The VSWR calculator 26 calculates the VSWR using the FW power that is calculated by the FW power calculator 17 and the Rev power that is calculated by the Rev power calculator 25.

The configuration of the radio device 10 can reduce the amount of calculation performed by the FW power calculator 17 and the Rev power calculator 25 compared to the case where the power of the signal having the transmission processing rate is calculated. In other words, it is possible to reduce the costs of operations for the VSWR.

According to the descriptions provided above, the FW power and the Rev power are calculated after downsampling is performed on the forward wave and the reflected wave. Alternatively, it is also satisfactory even when, for example, downsampling is performed on any one of the forward wave and the reflected wave and then the power of the wave is calculated, the power of the remaining wave is calculated without downsampling, and the VSWR is calculated using both of the calculated powers. In other words, the radio device 10 may be configured not to include any one of the downsampler 16 and the downsampler 24. This configuration also makes it possible to reduce the amount of calculation performed by the FW power calculator or the Rev power calculator 25 compared to the case where the power of the signal having the transmission processing rate is calculated.

According to the descriptions provided above, there is the premise that the two series of signals (the signal A and the signal B) are transmitted using the single transmission band. Alternatively, for example, the two series of signals may be transmitted using two transmission bands, respectively. In other words, for example, the two series of signals may be transmitted respectively using two transmission systems using different communication bands (e.g. the LTE communication system and the wireless LAN communication system).

The radio device 10 described above may be modified as follows.

First Modification

Figure 10:
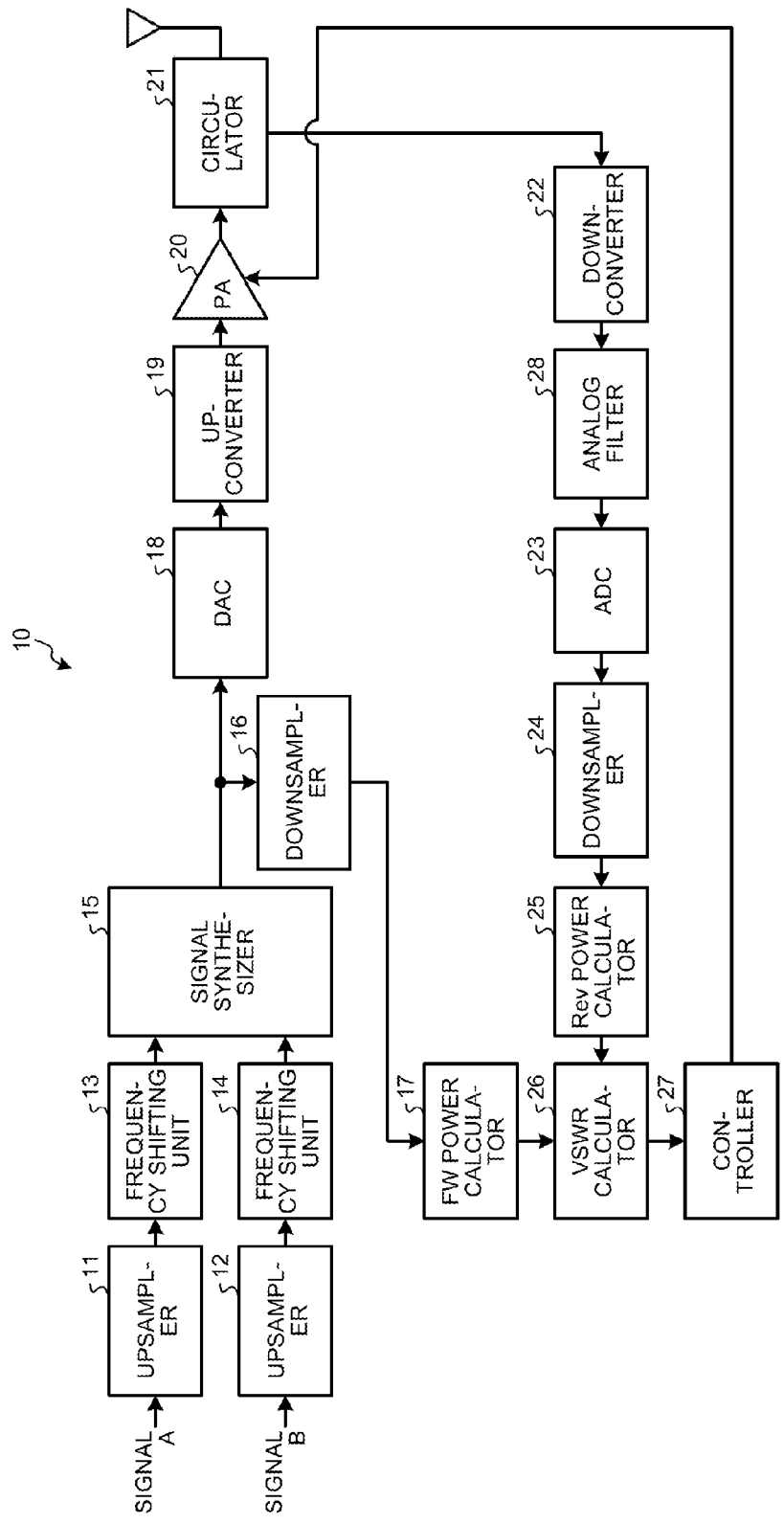
FIG. 10 is a diagram of a first modification of the radio device according to the first embodiment.

FIG. 10 is a diagram of a first modification of the radio device according to the first embodiment. The radio device 10 illustrated in FIG. 10 includes an analog filter 28 that is provided at the input stage of the ADC 23. The analog filter 28 limits the frequency components of the reflected wave other than desired frequencies. This makes it possible to remove interfering waves (e.g. the different station signal described above) other than the desired waves, which improves the accuracy of calculating the Rev power.

Second Modification

Figure 11:
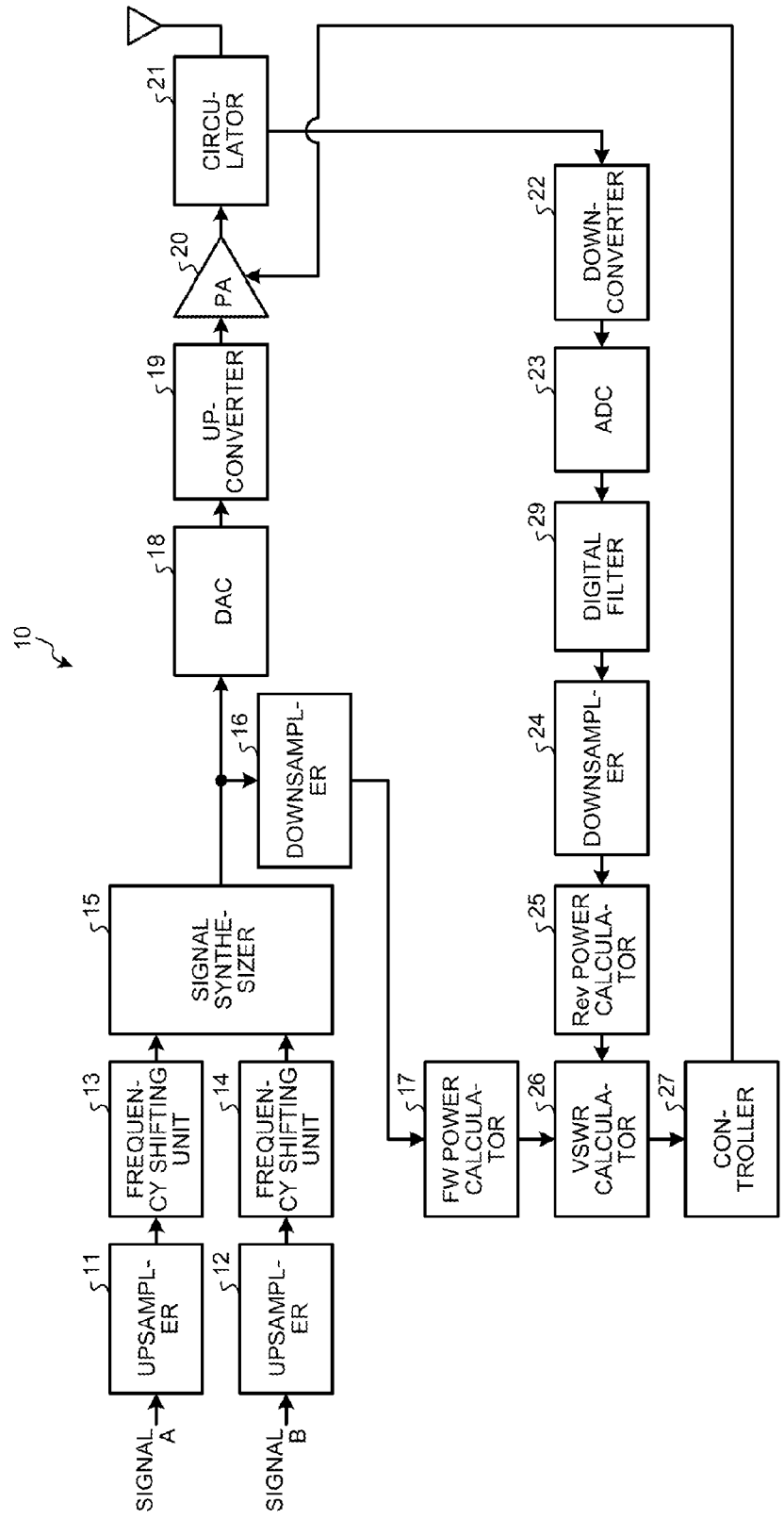
FIG. 11 is a diagram of a second modification of the radio device according to the first embodiment.

FIG. 11 is a diagram of a second modification of the radio device according to the first embodiment. The radio device 10 illustrated in FIG. 11 includes a digital filter 29 that is provided at the input stage of the Rev power calculator 25 and at the output stage of the ADC 23. The digital filter 29 limits the frequency components of the reflected wave other than desired frequencies. This makes it possible to remove interfering waves (e.g. the different station signals) other than desired waves, which improves the accuracy of calculating the Rev power. Furthermore, compared to the filter designing for an analog region such as that according to the first modification, the filter designing for a digital region such as that according to the second modification is easy and requires lower costs. Furthermore, downsizing of digital filters such as that according to the second modification is much easier than downsizing of analog filters such as that according to the first modification.

[b] Second Embodiment

According to a second embodiment, the FW power is calculated using the signal components of the forward wave before upsampling. In other words, according to the second embodiment, the "first component corresponding to a part of the transmission band from among the forward wave" is the signal component of the forward wave before upsampling.

Figure 12:
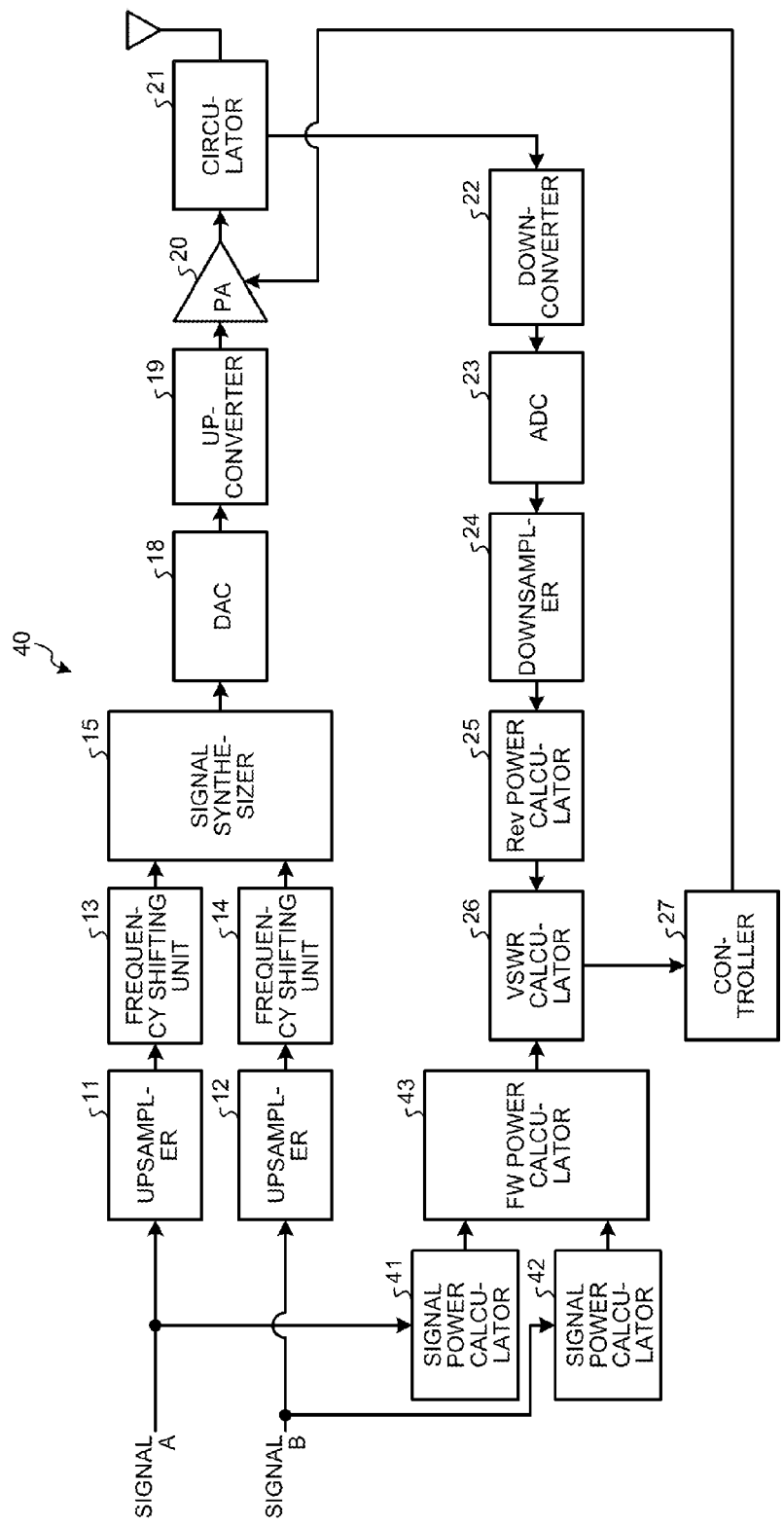
FIG. 12 is a block diagram of an exemplary radio device according to a second embodiment.

FIG. 12 is a block diagram of an exemplary radio device according to the second embodiment. According to FIG. 12, a radio device 40 includes signal power calculators 41 and 42 and an FW power calculator 43. According to the second embodiment, the signal power calculators 41 and 42 and the FW power calculator 43 serve as a "first calculator" and the Rev power calculator 25 serves as a "second calculator".

The signal power calculator 41 performs integration on the power of the signal A to calculate the power of the signal A. For example, as described above, the signal A has a baseband processing rate of 7.68 MHz and a transmission bandwidth of 5 MHz. The signal A is a signal having a center frequency of 0 Hz. Furthermore, for example, the interval of integration of power is 100 ms. In this case, the signal power calculator 41 calculates the power of the signal A using the data on $(7.68 \times 10^5)$ samples. In other words, because the signal power calculator 41 calculates the power of the "first component" corresponding to the part of the transmission band from among the forward wave, the amount of calculation performed by the signal power calculator 41 can be reduced compared to the case where the power of the signal having the transmission processing rate is calculated.

In the same manner as that of the signal power calculator 41, the signal power calculator 42 performs integration on the power of the signal B to calculate the power of the signal B.

The FW power calculator 43 calculates the FW power based on the power of the signal A that is calculated by the signal power calculator 41 and the power of the signal B that is calculated by the signal power calculator 42. For example, the FW power calculator 43 calculates, as the FW power, the sum of the power of the signal A that is calculated by the signal power calculator 41 and the power of the signal B that is calculated by the signal power calculator 42.

The VSWR calculator 26 calculates the VSWR using the "FW power" calculated by the FW power calculator 43 and the "Rev power" calculated by the Rev power calculator 25.

Upon determining that the Rev power is above a given level according to the VSWR calculated by the VSWR calculator 26, the controller 27 outputs an output stop instruction signal to the PA 20. This makes it possible to stop the output of the PA 20 when it is determined that there is a risk that the devices of the amplifier would be damaged by the reflected wave.

According to the second embodiment, the signal power calculators 41 and 42 of the radio device 40 calculate the "FW power" using the signal components (i.e., the signal A and the signal B) of the forward wave before upsampling.

The configuration of the radio device 40 can reduce the amount of calculation performed by the signal power calculators 41 and 42 compared to the case where the power of the signal having the transmission processing rate is calculated. In other words, it is possible to reduce the costs of operations for the VSWR. Furthermore, the configuration of the radio device 40 makes it possible to calculate the FW power using the signal components (i.e., the signal A and the signal B) of the forward wave before synthesizing that is performed by the signal synthesizer 15, which makes it possible to avoid mounting of a filter for extracting the signal components before synthesis from the synthesized signal.

According to the descriptions provided above, the Rev power is calculated after downsampling is performed on the reflected wave; however, it is also satisfactory when downsampling is not performed. When the downsampling performed by the downsampler 24 is not performed, the Rev power calculator 25 calculates the Rev power using the data on $(61.44 \times 10^5)$ samples.

[c] Third Embodiment

According to a third embodiment, the FW power is calculated using the signal components of the forward wave before upsampling as in the case of the second embodiment; however, while the FW power is calculated based on the power of the signal A and the power of the signal B according to the second embodiment, the power of the signal A or the power of the signal B is selected as the FW power according to the third embodiment.

Figure 13:
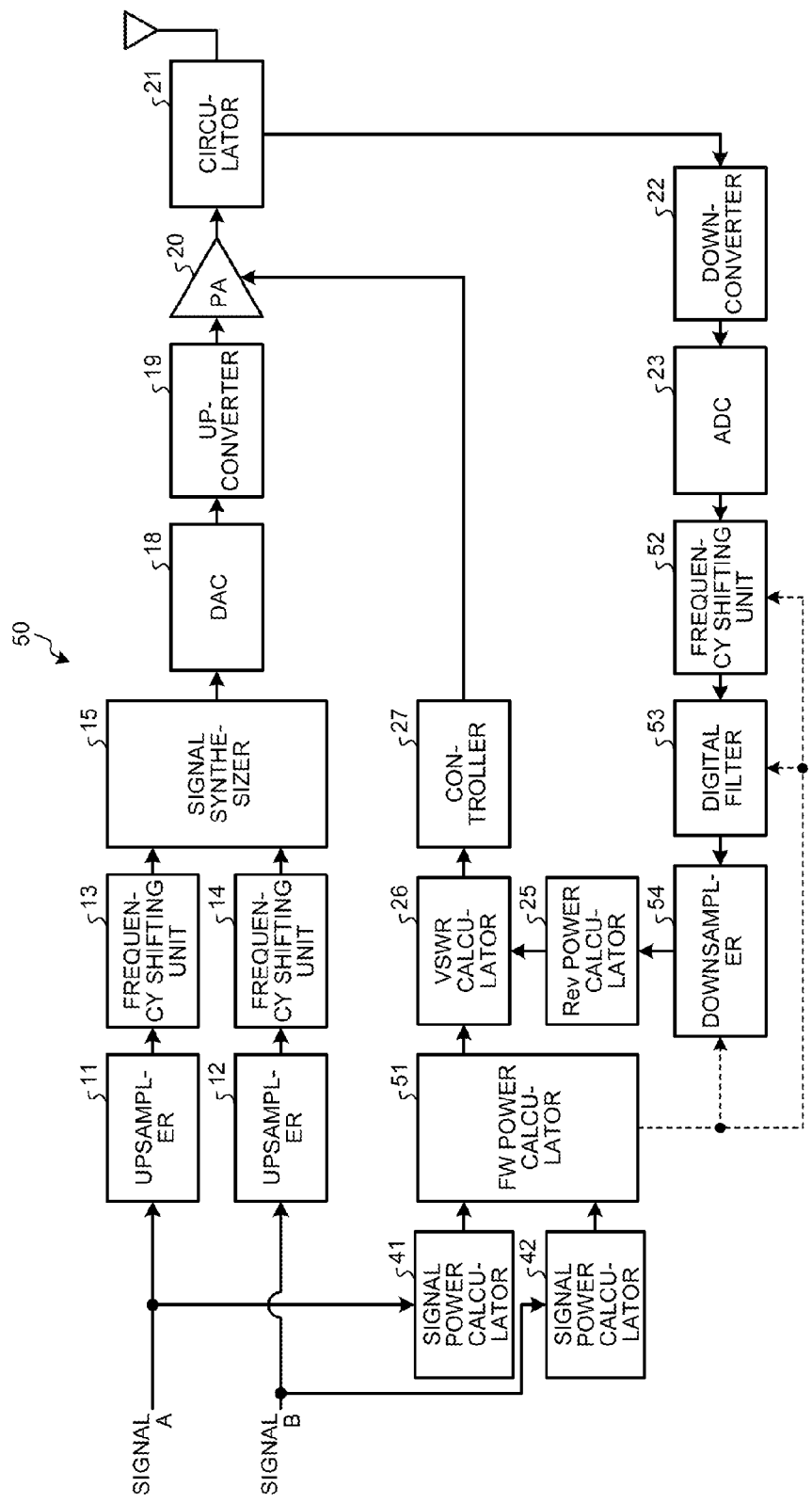
FIG. 13 is a block diagram of an exemplary radio device according to a third embodiment.

FIG. 13 is a block diagram of an exemplary radio device according to the third embodiment. As illustrated in FIG. 13, a radio device 50 includes an FW power calculator 51, a frequency shifting unit 52, a digital filter 53, and a downsampler 54. According to the third embodiment, the signal power calculators 41 and 42 and the FW power calculator 51 serve as the "first calculator" and the Rev power calculator 25 serves as the "second calculator".

The FW power calculator 51 selects any larger one of the power of the signal A calculated by the signal power calculator 41 and the power of the signal B calculated by the signal power calculator 42 and outputs the selected power as the "FW power" to the VSWR calculator 26. For example, the FW power calculator 51 may identify the signal for which a greater power is set according to the transmitter signal strength indication (TSSI) that is transmitted from the upper layer.

The FW power calculator 51 outputs the information on the signal corresponding to the selected power (the center frequency, frequency shift amount and shift direction, transmission bandwidth, and baseband processing rate, etc.) to the frequency shifting unit 52, the digital filter 53, and the downsampler 54.

According to the frequency shift amount and shift direction contained in the information received from the FW power calculator 51, the frequency shifting unit 52 shifts the frequency of the signal that is received from the ADC 23 by the same amount as the frequency shift amount in the opposite direction to the shift direction. Accordingly, it is possible to set 0 Hz (i.e., the center frequency of the signal whose power is selected by the FW power calculator 51) for the center frequency of the signal that is contained in the reflected wave and that corresponds to the signal whose power is selected by the FW power calculator 51.

According to the transmission bandwidth contained in the information that is received from the FW power calculator 51, the digital filter 53 sets a filter coefficient such that the signal components other than those of the frequency region whose center is at 0 Hz and having the transmission bandwidth are suppressed.

According to the baseband processing rate contained in the information received from the FW power calculator 51, the downsampler 54 performs downsampling on the signal that is received from the digital filter 53 such that the baseband processing rate is implemented. When each of the signal A and the signal B has a baseband processing rate of 7.68 MHz, the downsampling processing leads to a signal having a baseband processing rate of 7.68 MHz. Accordingly, the Rev power calculator 25 calculates the Rev power using the data on $(7.68 \times 10^5)$ samples.

According to the third embodiment, as described above, the FW power calculator 51 of the radio device 50 calculates the "FW power" using the signal having the highest power from among the several signal components of the forward wave before upsampling (i.e., the signal A and the signal).

The configuration of the radio device 10 can improve the accuracy of calculating the power.

According to the descriptions provided above, the Rev power is calculated after downsampling is performed on the reflected wave; however, it is satisfactory even when downsampling is not performed. When the downsampling performed by the downsampler 54 is not performed, the Rev power calculator 25 calculates the Rev power using the data on $(61.44 \times 10^5)$ samples.

[d] Other Embodiments

Figure 14:
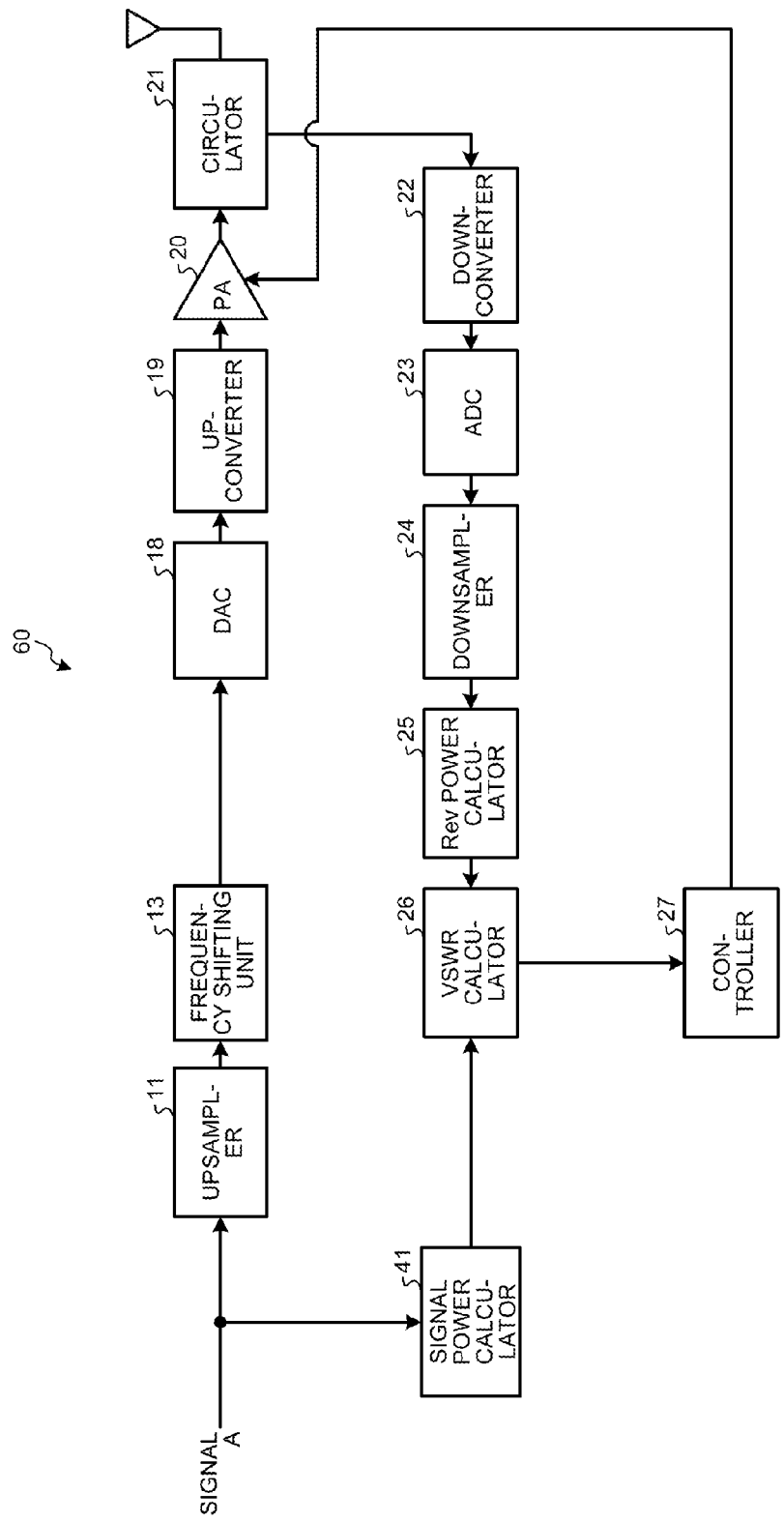
FIG. 14 is a block diagram of an exemplary radio device according to another embodiment.

[1] According to the descriptions for the second embodiment, there is the premise that the two series of signals (the signal A and the signal B) are transmitted. Alternatively, one series of signals may be transmitted. FIG. 14 is a block diagram of an exemplary radio device of another embodiment. Basically, a radio device 60 illustrated in FIG. 14 does not include any functional unit relevant to the signal B.

As in the case of the second embodiment, the configuration of the radio device 60 can reduce the amount of calculation performed by the signal power calculator 41 compared to the case where the power of the signal having the transmission processing rate is calculated.

According to the configuration of the radio device 60 illustrated in FIG. 14, the Rev power is calculated after downsampling is performed on the reflected wave; however, it is also satisfactory even when downsampling is not performed. When the downsampling performed by the downsampler 24 is not performed, the Rev power calculator 25 calculates the Rev power using the data on $(61.44 \times 10^5)$ samples.

Figure 15:
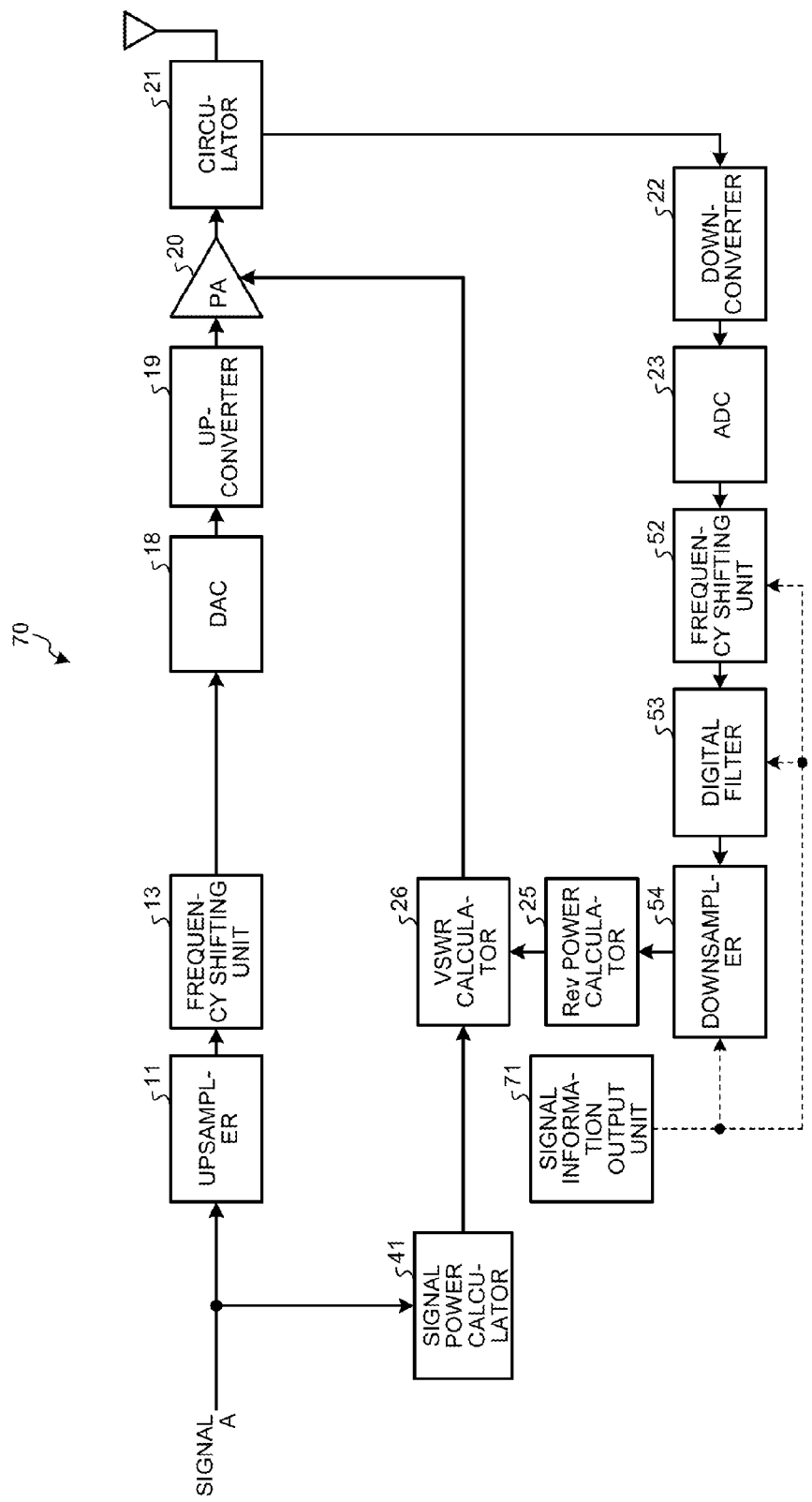
FIG. 15 is a block diagram of an exemplary radio device according to still another embodiment.

[2] According to the descriptions for the third embodiment, there is the premise that the two series of signals (the signal A and the signal B) are transmitted. Alternatively, one series of signals may be transmitted. FIG. 15 is a block diagram of an exemplary radio device of still another embodiment. Basically, a radio device 70 illustrated in FIG. 15 does not include any functional unit relevant to the signal B. Furthermore, the radio device 70 includes a signal information output unit 71 that outputs the information on the signal A (the center frequency, frequency shift amount and shift direction, transmission bandwidth, and baseband processing rate, etc.).

As in the case of the third embodiment, the configuration of the radio device 70 can reduce the amount of calculation performed by the signal power calculator 41 compared to the case where the power of the signal having the transmission processing rate is calculated.

According to the configuration of the radio device 70 illustrated in FIG. 15, the Rev power is calculated after downsampling is performed on the reflected wave; however, it is also satisfactory even when downsampling is not performed. When the downsampling performed by the downsampler 54 is not perform, the Rev power calculator 25 calculates the Rev power using the data on $(61.44 \times 10^5)$ samples.

[3] The components of each unit according to the first to third embodiments and other embodiments [1] and [2] that are illustrated in the drawings do not necessarily have to be configured physically in the same manner as that illustrated in the drawings. In other words, specific modes of separation and integration among the units are not limited to those illustrated in the drawings, and they may be configured by entirely or partly separating or integrating them functionally or physically according to various types of load or the circumstance and according to an arbitrary unit.

Furthermore, all or a given part of the various processing functions implemented by each device may be implemented by a central processing unit (CPU) (or a microcomputer such as a micro processing unit (MPU) or a micro control unit (MCU)). All or a given part of various processing functions may be implemented by using a program that is analyzed and executed by the CPU (or a microcomputer such as a MPU or MCU) or by using wired logic hardware.

The radio devices according to the first to third embodiments and other embodiments [1] and [2] can be implemented using, for example, the following hardware configuration.

Figure 16:
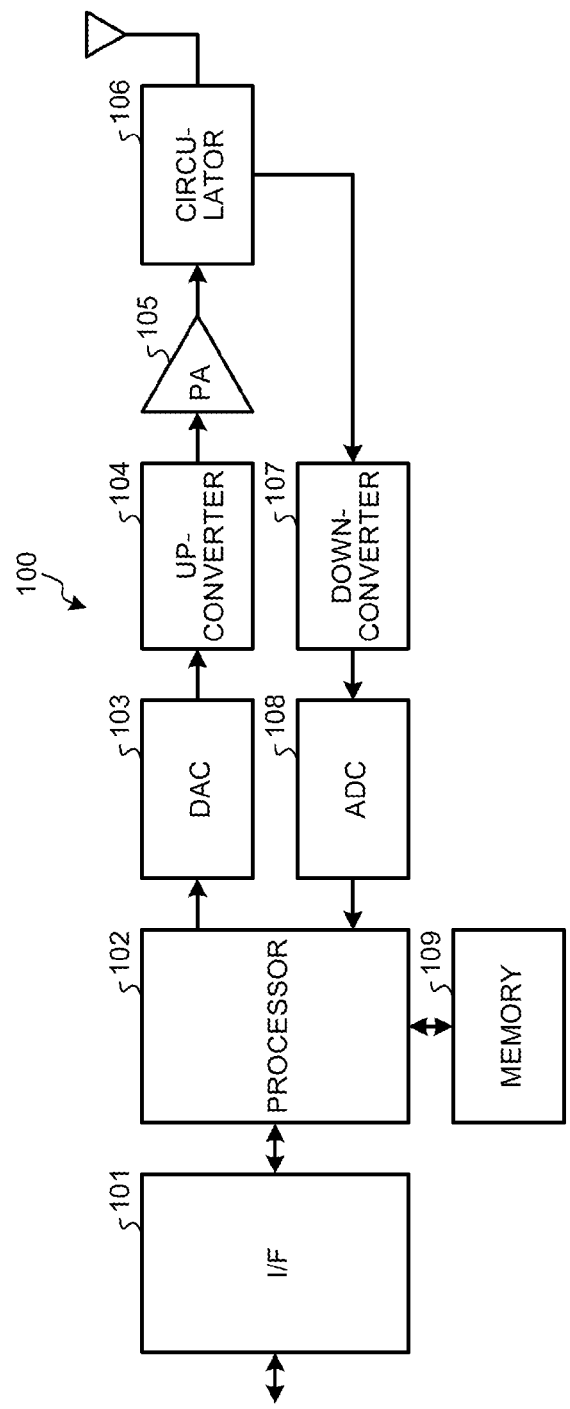
FIG. 16 is a diagram of an exemplary hardware configuration of a radio device.

FIG. 16 is a diagram of an exemplary hardware configuration of a radio device. As illustrated in FIG. 16, a radio device 100 includes an inter face (I/F) 101, a processor 102, a DAC 103, an upconverter 104, a PA 105, a circulator 106, a downconverter 107, an ADC 108, and a memory 109. The I/F 101 is an interface that transmits/receives signals with a control device (not illustrated). The processor 102 may be, for example, a CPU, a digital signal processor (DSP), or a field programmable gate array (FPGA). The memory 109 may be, for example, a random access memory (RAM) such as a synchronous dynamic random access memory (SDRAM), a read only memory (ROM), or a flash memory. Each of the radio devices 10, 40, 50, 60 and 70 according to the first to third embodiments and other embodiments [1] and [2] has the hardware configuration illustrated in FIG. 16.

Various processing functions performed by the radio devices according to the first to third embodiments and other embodiments [1] and [2] may be implemented by executing the programs stored in various memories, such as a non-volatile memory media, using a processor. In other words, the programs corresponding to respective sets of processing performed by the upsamplers 11 and 12, the frequency shifting units 13, 14 and 52, the signal synthesizer 15, the downsamplers 16, 24 and 54, the FW power calculators 17, 43 and 51, the Rev power calculator 25, the VSWR calculator 26, the controller 27, the digital filters 29 and 53, the signal power calculators 41 and 42, and the signal information output unit 71 may be stored in the memory 109 and the processor 102 may execute each of the programs. The DAC 18, the upconverter 19, and the PA 20 are implemented by the DAC 103, the upconverter 104, and the PA 105, respectively. The circulator 21, the downconverter 22, and the ADC 23 are implemented by the circulator 106, the downconverter 107, and the ADC 108.

The processor 102 implements the various processing functions performed by the radio devices according to the first to third embodiments and other embodiments [1] and [2]. Alternatively, they may be implemented by several processors.

According to an aspect of the disclosed embodiment, it is possible to reduce the costs of operations for the VSWR.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio device configured to perform upsampling on a forward wave containing a first signal and a second signal to broaden a processing band to a transmission band, then amplifying the forward wave using an amplifier, and transmitting the forward wave, the radio device comprising:
   a first calculator that calculates the power of a first component corresponding to the first signal of the transmission band from among the forward wave when the power of the first signal is larger than the power of the second signal and calculates the power of the first component corresponding to the second signal of the transmission band from among the forward wave when the power of the first signal is less than the power of the second signal;
   a second calculator that calculates the power of a second component corresponding to a part of the transmission band from among a reflected wave from the antenna toward the amplifier, a frequency of the second component being same as a frequency of the first component;
   a third calculator that calculates a voltage standing wave ratio on the basis of the calculated power of the first component and the calculated power of the second component.

2. A radio device configured to perform upsampling on a forward wave containing a first signal and a second signal to broaden a processing band to a transmission band, then amplifying the forward wave using an amplifier, and transmitting the forward wave, the radio device comprising:
   a first calculator that calculates the power of a first component corresponding to a part of the transmission band from among the forward wave;

a second calculator that calculates the power of a second component corresponding to a part of the transmission band from among a reflected wave from the antenna toward the amplifier;

a third calculator that calculates a voltage standing wave ratio on the basis of the calculated power of the first component and the calculated power of the second component; and a synthesizer that is provided at an input stage of the amplifier and that synthesizes the first signal and the second signal and transmits a synthesized signal thus obtained to the amplifier, wherein the first calculator uses, as the first component, signal components of the forward wave before the synthesizing performed by the synthesizer.

3. A radio device configured to perform upsampling on a forward wave containing a first signal and a second signal to broaden a processing band to a transmission band, then amplifying the forward wave using an amplifier, and transmitting the forward wave, the radio device comprising:

a first calculator that calculates the power of a first component corresponding to a part of the transmission band from among the forward wave;

a second calculator that calculates the power of a second component corresponding to a part of the transmission band from among a reflected wave from the antenna toward the amplifier;

a third calculator that calculates a voltage standing wave ratio on the basis of the calculated power of the first component and the calculated power of the second component; and a synthesizer that is provided at an input stage of the amplifier and that synthesizes the first signal and the second signal and transmits a synthesized signal thus obtained to the amplifier, wherein the first calculator uses, as the first component, signal components of the forward wave before the synthesizing performed by the synthesizer and before the upsampling.

4. A radio device configured to perform upsampling on a forward wave containing a first signal and a second signal to broaden a processing band to a transmission band, then amplifying the forward wave using an amplifier, and transmitting the forward wave, the radio device comprising:

a first calculator that calculates the power of a first component corresponding to a part of the transmission band from among the forward wave;

a second calculator that calculates the power of a second component corresponding to a part of the transmission band from among a reflected wave from the antenna toward the amplifier;

a third calculator that calculates a voltage standing wave ratio on the basis of the calculated power of the first component and the calculated power of the second component;

an analog-digital converter that is provided at an input stage of the second calculator and that performs analog-digital conversion on the reflected wave; and a digital filter that is provided at the input stage of the second calculator and at an output stage of the analog-digital converter and that limits frequency components other than desired frequencies of the reflected wave.

5. The radio device according to claim 3, wherein the first calculator uses, as the first component, any one of the first signal and the second signal, for which a higher power level is set.

* * * * *